Jan. 20, 1931.  E. GOLDBERG  1,789,679
CINEMATOGRAPHIC CAMERA
Filed Aug. 6, 1928
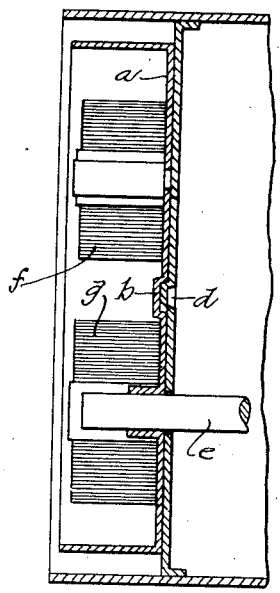
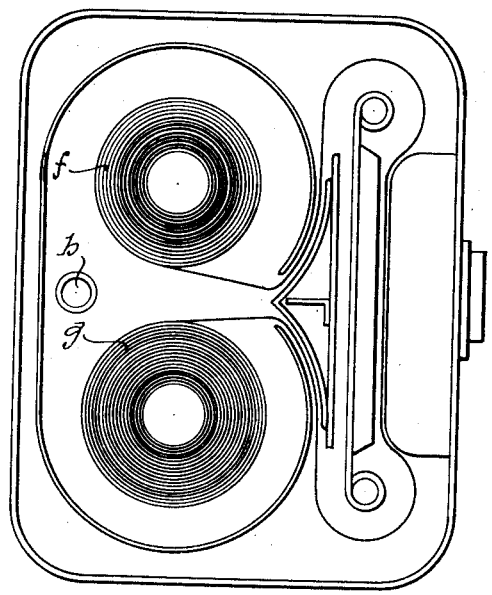
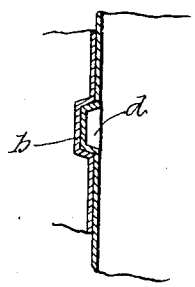
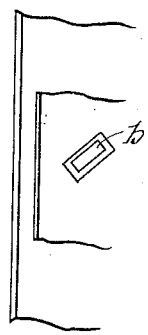
Inventor
Emanuel Goldberg
By his Attorney
George C. Heinicke Patented Jan. 20, 1931

1,789,679

UNITED STATES PATENT OFFICE

EMANUEL GOLDBERG, OF DRESDEN, GERMANY

CINEMATOGRAPHIC CAMERA

Application filed August 6, 1928, Serial No. 297,716, and in Germany September 5, 1927.

This invention relates to improvements in cinematographic cameras, particularly to the mounting of the film cassette in such cameras, and it is the principal object of my invention to provide a camera in which the film cassette is positively secured against displacement within the camera especially laterally to the same.

In many of the known apparatus of this kind the film cassette is loosely mounted within the camera at its lower part upon the spindle of the film reel, however, such mounting does not prevent an oscillation of the upper part of the film cassette and consequent change in the location of the same within the camera which eventually is unquestionably harmful to the proper working of the film winding and unwinding operations.

It is the purpose of the present invention to overcome this disadvantage by securing the film cassette positively within the camera in a simple and expedient manner.

Another object of my invention is the provision of a film cassette-mounting for cinematographic cameras of simple and therefore inexpensive construction, yet durable, and efficient in operation.

These and other objects and advantages of my invention will become more fully known as the description thereof proceeds, and will then be more specifically defined in the appended claims.

In the accompanying drawing, forming a material part of this disclosure:

Fig. 1 is a fragmentary sectional end view of a camera equipped with a film cassette-mounting constructed according to my invention.

Fig. 2 is a diagrammatic side elevation of a camera constructed according to my invention.

Fig. 3 is a fragmentary end elevation of a modified form of film cassette mounting.

Fig. 4 is a similar side elevation thereof.

In the form of my invention illustrated in Figures 1 and 2 *a* designates the bottom of the film cassette which is provided with a depression *b* coinciding with a similar depression *d* provided in the wall *c* of the camera. It will be clear that the engagement of the button or rib of substantially the form of a truncated cone formed by depression *d* in the camera wall in depression *b* in the film cassette will positively hold the film cassette in its position within the camera about the reel spindle *e*.

It is evident that in this manner a convenient and positive mounting of the film cassette within the camera protected against oscillations is effected without necessitating the use of pins or other auxiliary means, allowing a ready introduction and securing of the film cassette within the camera.

As point of engagement between camera wall and film cassette is preferably selected between the two film-rolls *f* and *g* and this point is selected as the least interfering with the proper operation of the film-rolls.

In the modified form of my invention illustrated in Figures 3 and 4, the film cassette is mounted within the camera in a similar manner as described with respect to my preferred form, with the exception that the button or rib formed by depression *d* in the camera wall has a rectangular shape adapted to snugly engage and fit into a similarly shaped depression *b* in the film cassette bottom.

The operation of my device will be entirely clear from the above description by simultaneous inspection of the drawing, and it will be understood that I may make such changes in the general arrangement and in the construction of the minor details of my invention as come within the scope of the appended claims, without departure from the spirit of my invention and the principles involved.

Thus, for instance, the buttons or ribs and the depressions corresponding therewith may have any desired suitable shape or location and the ribs may either be provided by depressions in the camera wall entering corresponding depressions in the film cassette walls, as shown, or vice versa, ribs formed in the film cassette wall may engage corresponding shaped depressions in the camera wall.

Having thus described my invention what I claim as new and desire to secure by Letters Patent is:

1. In a cinematographic camera comprising a cassette and a pair of film rolls, a locking member formed on the cassette wall between both film rolls, and a camera wall having formed therein a depression corresponding to the form of said locking member on the film cassette to be engaged thereby for readily locking the cassette in its relative position to the camera against lateral displacement therein.

2. In a cinematographic camera comprising a cassette, and a pair of film rolls, a rectangularly shaped locking member formed on the cassette wall between both film rolls, and a camera wall having formed therein a rectangularly shaped depression adapted to receive the locking member formed on the cassette for readily locking the cassette in its relative position to the camera against lateral displacement.

Signed at Dresden, A, in the county of Saxony and State of Germany, 1928.

EMANUEL GOLDBERG.